Jan. 14, 1964  N. O. ROSAEN  3,117,525
VACUUM RESPONSIVE VALVE
Filed March 23, 1961  4 Sheets-Sheet 1
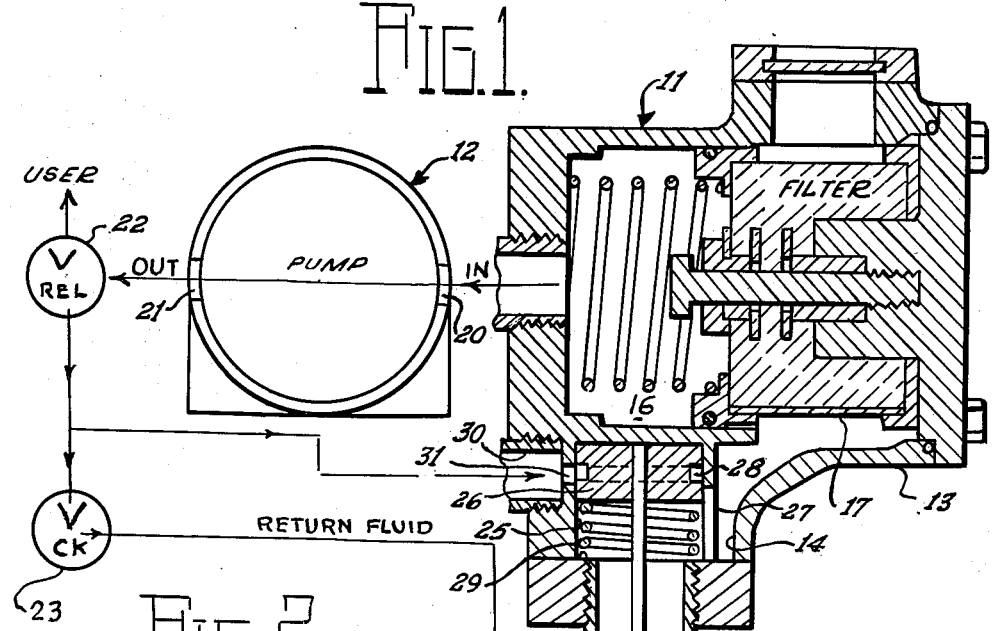
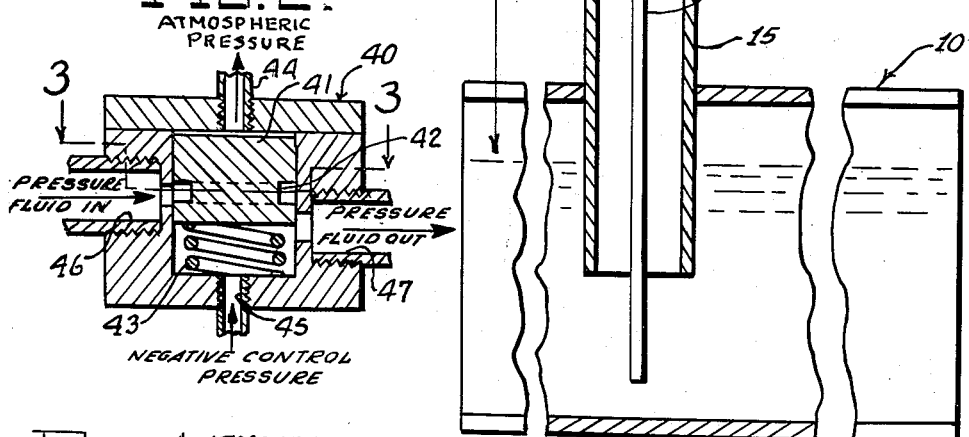
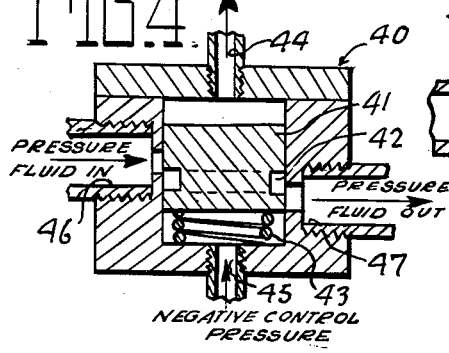
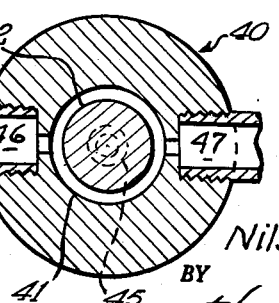
INVENTOR.
Nils O. Rosaen
BY
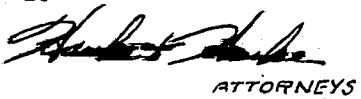
ATTORNEYS

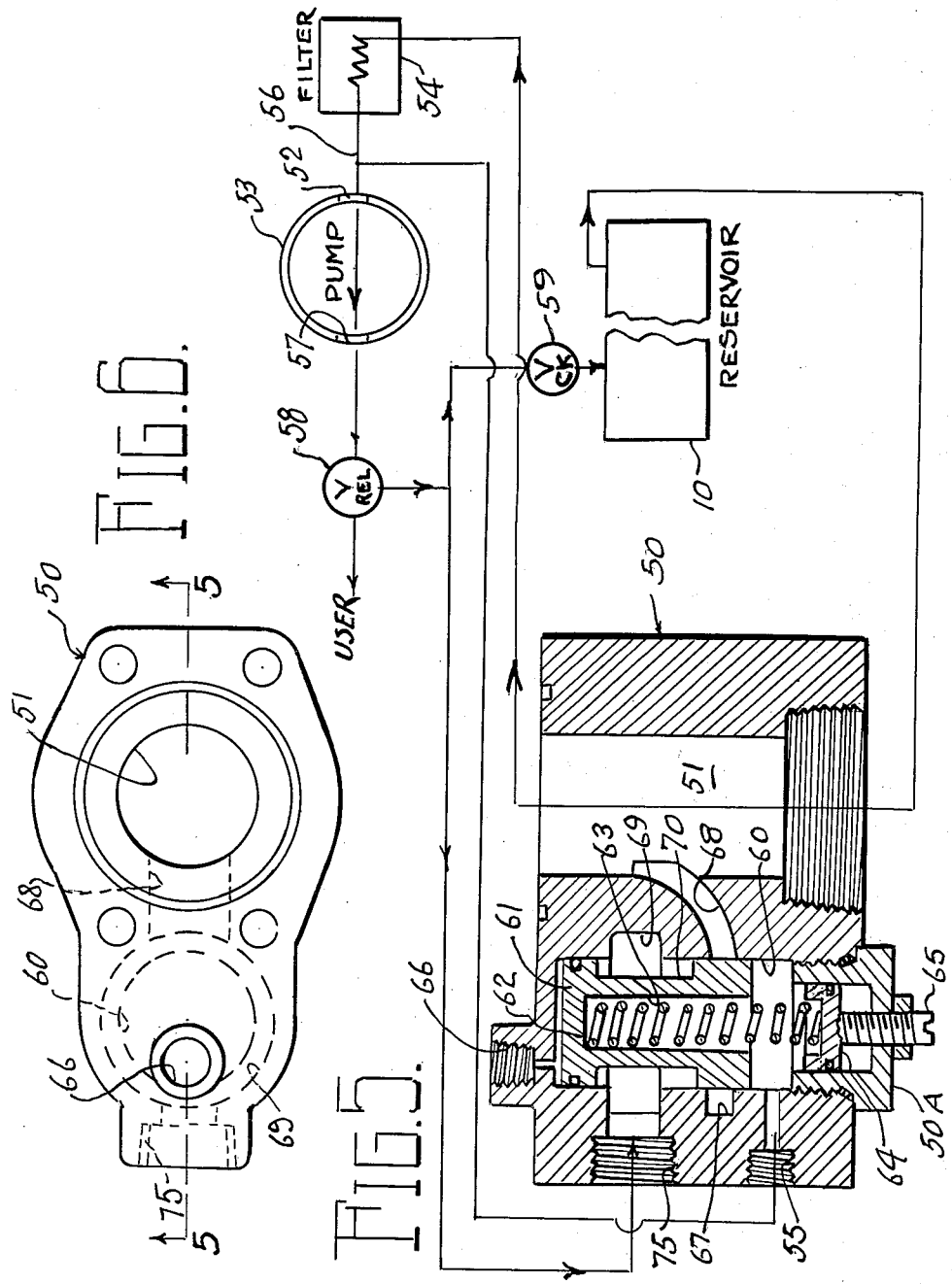

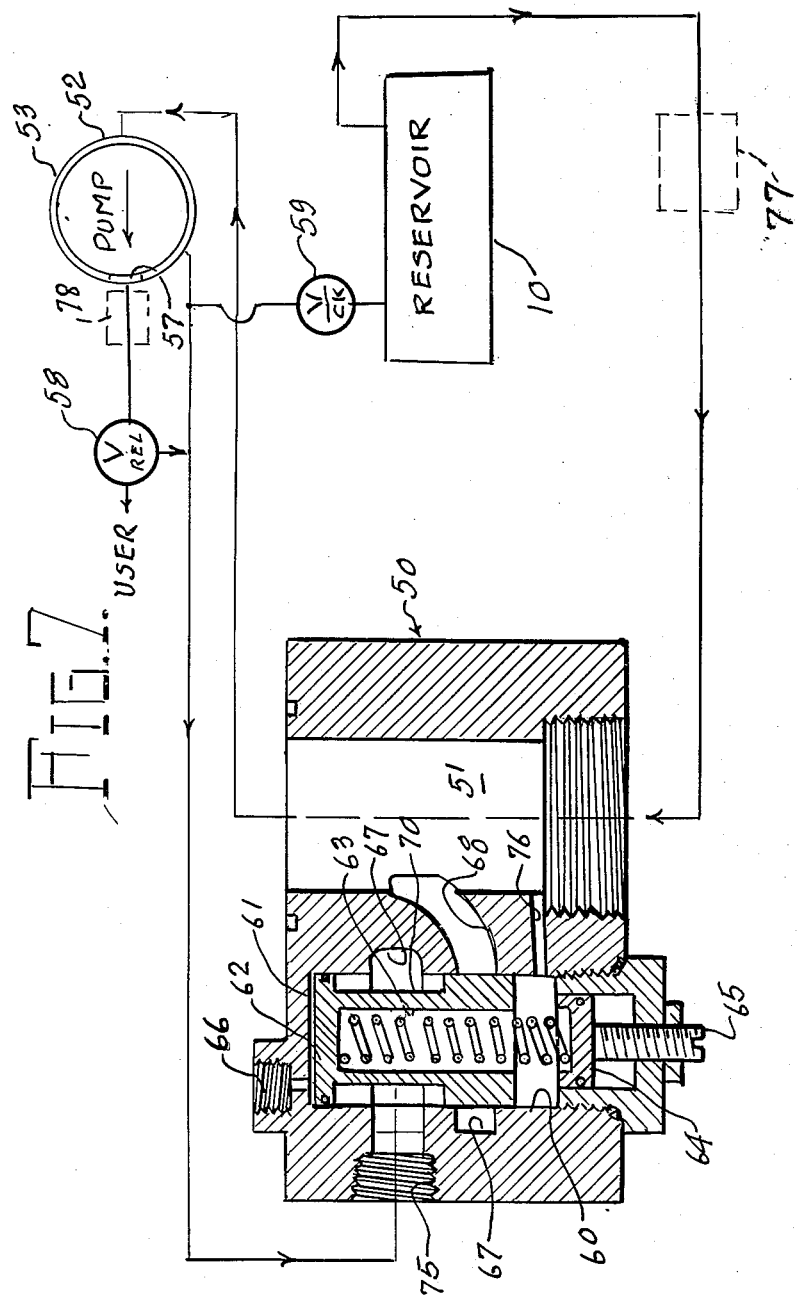

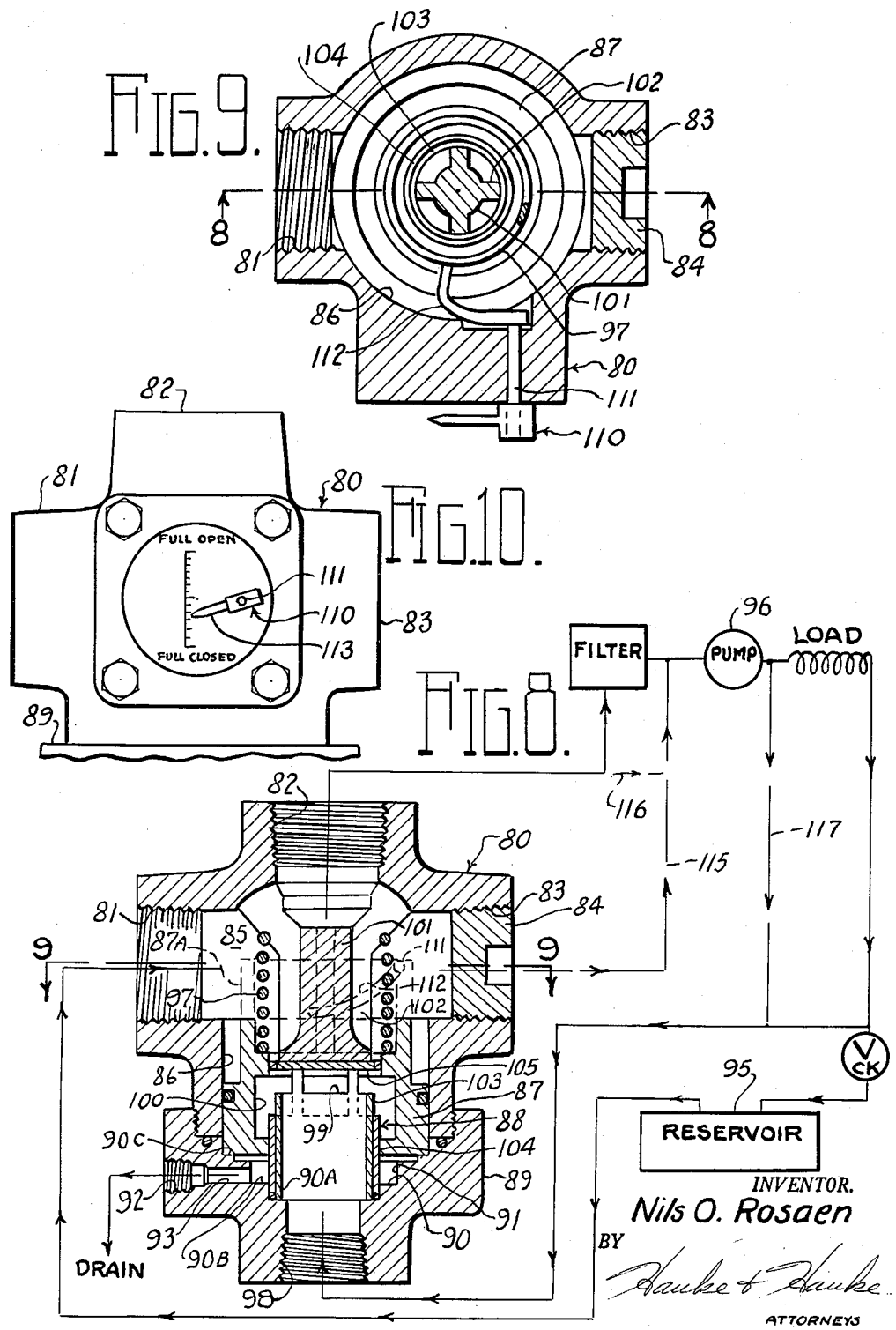

United States Patent Office 3,117,525
Patented Jan. 14, 1964

3,117,525
VACUUM RESPONSIVE VALVE
Nils O. Rosaen, Detroit, Mich., assignor to The Rosaen Filter Company, Detroit, Mich., a corporation of Michigan
Filed Mar. 23, 1961, Ser. No. 108,972
10 Claims. (Cl. 103—41)

My invention relates to fittings for fluid systems and more particularly to a bypass fitting adapted for connection to varying fluid supply systems and the like.

In the operation of fluid supply systems, such as oil, water and hydraulic systems utilizing pressure pumps, a source of difficulty is often encountered when blockage occurs between the pump intake and the source of fluid, when circumstances such as freezing cause large decreases in pump intake pressure or when the system includes an extremely long inlet pipe from the fluid reservoir to the pump intake. Any one or all of these conditions may result in overloading or cavitation which can seriously damage the pump.

An object of the present invention is to safeguard against the above conditions by providing another path for the fluid which will keep the pumping circuit in operation.

Another object of the invention is to prevent excessive decreases in fluid pump intake pressures by providing a means of connecting the pump discharge outlet with the pump intake in response to such pressure drops.

A further object of the invention is to protect fluid systems by providing means of setting a minimum pressure acceptable on the inlet side of the fluid pump.

Still another object of the invention is to improve fluid systems by providing a closed loop circuit in which make-up fluid, required by external leakages and the like, is introduced to the pump intake as needed, being set by an input volume control means.

Yet a further object of the invention is to assist fluid flow from a fluid source to a pump by providing a recirculating circuit in which fluid is directed from the pump discharge to the intake in a manner operable to produce siphoning of fluid from the fluid source.

A still further object of the invention is to provide a means for bypassing fluid involving a valve which actuates an indicator for providing visual means of showing the degree of bypassing.

For a more complete understanding of the invention, reference may be had to the accompanying drawings illustrating preferred embodiments of the invention in which like reference characters refer to like parts throughout the several views and in which—

FIG. 1 illustrates one modification of a fluid circuit embodying the invention in diagrammatic form.

FIG. 2 is a diagrammatic cross-sectional view of the volume control device of the invention adapted for installation in a fluid circuit.

FIG. 3 is a cross-sectional view taken substantially on the line 3—3 of FIG. 2.

FIG. 4 is a view of the device as in FIG. 2 but illustrating the bypass position.

FIG. 5 is a diagrammatic view of another fluid circuit embodying the invention and illustrating the control device in cross-section taken substantially on the line 5—5 of FIG. 6.

FIG. 6 is a top view of the control device of FIG. 5.

FIG. 7 is a diagrammatic view of still another fluid circuit embodying the invention with the same control device as in FIG. 5.

FIG. 8 illustrates another modification of the control device in cross-section taken substantially on the line 8—8 of FIG. 9 and installed in a fluid system showing alternative fluid paths.

FIG. 9 is a cross-sectional view taken substantially on the line 9—9 of FIG. 8.

FIG. 10 is a fragmentary elevational view of the control device of FIGS. 8 and 9.

In FIG. 1, one preferred fluid system is illustrated as comprising a fluid reservoir 10, a filtering device 11, and a pump 12 connected as shown.

The filtering device 11 comprises a housing 13 having an inlet chamber 14 connected by any means such as a pipe 15 with the reservoir 10, an outlet chamber 16, and a filter element 17 intermediate the chambers. The outlet chamber 16 is connected with the intake 20 of the pump 12, and the discharge outlet 21 of the pump delivers fluid under pressure to the user system, preferably through a relief valve 22. Return oil from the relief valve 22 preferably flows to the reservoir 10 through a resistance check valve 23 to maintain fluid pressure on the return side of the relief valve 22.

In the inlet chamber 14 of the filtering device 11 is an input volume control device comprising a cylinder 25 containing a pressure responsive element such as an axially movable spool-type piston 26. The cylinder 25 has an opening 27 to permit fluid flow to the filter 17. The piston 26 has an annular bypass groove 28 and is normally urged by a spring 29 or the like to a position in which the groove 28 is in a closed position out of register with the opening 27. A port 30 is provided in the housing 13 and adapted for connection with the pressure side of the pump 12 at a location such as downstream of the relief valve 22 in the return fluid circuit.

A passage 31 connects the port 30 with the cylinder 25 and is adapted to be openly registered at all times with the annular groove 28 in the piston 26. The piston 26 is subjected at one end, the lower end as shown in FIG. 1, to inlet fluid pressure as well as the pressure of the spring 29, while the other end is subject to a substantially constant pressure such as atmospheric pressure. This may be provided by using a small tube or conduit 32 which extends through the piston 26 and pipe 15 into the reservoir 10, the fluid therein normally being under atmospheric pressure.

It sometimes happens that the intake pipe 15 may become clogged by a rag or other foreign matter, such as sludge or the like, or in freezing conditions may be unable to pass fluid readily to the filter 17. Pressure on the lower end of the piston 26 decreases, increasing the pressure differential across the piston so that it will move downward against the force of the spring 29, openly connecting the annular groove 28 to the opening 27. Fluid from the outlet side of the pump 12 will then flow into the port 30, passage 31, and thence to the inlet chamber 14, from which it goes through the filter 17 to the intake 20 of the pump 12. Thus the pump circuit is maintained in operation by virtue of an alternate path, minimizing the danger of pump damage.

It will be seen that the force of the spring 29 sets the degree of inlet pressure drop necessary to open the alternate circuit, and therefore imposes a minimum fluid pressure on the inlet side of the pump 20 and filter 17. Inlet pressure can never drop below this limit. Different predetermined spring rates will impose different limits on the system.

Such a device is valuable also in systems having long intake pipes from the reservoir. A spring 29 may be chosen which will permit almost continuous recirculation of fluid through to control device and require that only makeup fluid, needed to replace fluid lost by external leakages, be drawn from the reservoir, rather than requiring all oil to be drawn from the reservoir as in conventional systems.

In FIGS. 2, 3 and 4, a similar volume control device 40 is shown independently of a filter and may be inserted into other types of fluid systems. The piston 41 with an annular groove 42, and the spring 43 are substantially similar to comparable elements of FIG. 1. Atmospheric pressure is admitted through a port 44 to the top of the piston 41; negative control pressure, i.e. inlet pressure of a pump, is admitted through a port 45 to the lower spring-loaded side of the piston 41; pressure fluid, i.e. pump discharge fluid, is admitted through a port 46 at all times to the groove 42 of the piston 41; and make-up fluid is discharged through a port 47 only when the piston is shifted to the position of FIG. 4 by increase in pressure differential across the piston.

Another control device modification is shown in FIGS. 5 and 6 as comprising a housing 50 provided with a fluid passage 51 adapted for series installation in the suction line of a fluid system such that fluid from the reservoir 10 will pass through the housing 50 in flowing to the intake 52 of a pump 53, first passing through a filter 54.

Control pressure in this system is connected to a port 55 and taps in between the filter 54 and pump intake 52 as at 56. Fluid under pressure flows from the pump outlet 57 to a relief valve 58 and thence to the fluid user. Spill fluid from the relief valve preferably flows through a resistance check valve 59 back to the reservoir 10 under normal operating conditions.

A cylindrical control chamber 60, closed by a cap 50A, is provided in the housing 50 and contains a spool-type piston 61 resiliently urged to the closed position shown by any means such as a spring 62 having one end disposed in an axial bore 63 in the piston and the other end bearing on a seat element 64 carried within the cap 50A.

An adjustment screw 65 is carried by the cap 50A to provide for varying the compression pressure on the spring 62 and hence the pressure setting of the control device.

The upper end of the chamber 60 is openly connected with a substantially constant source of pressure such as atmosphere by a port 66. An annular groove 67, connected with the passage 51 by a passage 68, is closed, when the piston 61 is in the position shown, from communication with an annular groove 69. Groove 69 is at all times open to a reduced diameter portion 70 of the piston 61.

A port 75 in the housing 50 is openly connected with the groove 69 and communicates with the pressure outlet 57 of the pump 53, preferably between the relief valve 58 and the reservoir 10.

The port 55 communicates with the lower end of the chamber 60. The piston 61 is thus made responsive to pressure differential between atmospheric pressure on one end and pump suction pressure modified by the force of the spring 62 on the other end.

If pressure at the intake of the pump 53 decreases to produce sufficient reduced pressure beneath the piston 61, it will compress the spring 62 to open the reduced diameter portion 70 of the piston 61 to the passage 68. Fluid under pressure from the pump 53 will flow into the passage 51, thence back to the inlet side of the pump 53.

It is noted that the passage 68 is curved to direct fluid in the direction of normal flow through the passage 51, assisting flow from the reservoir 10 by means of siphoning, and raising the pressure at the inlet of the filter 54 and pump to whatever is established by the spring 62. The greater the compression of the spring 62, the lower must be the pressure at the inlet of the pump to open the passage 68 to pump delivery pressure. Thus the adjustment of compression on the spring 62 establishes a reliable limit to pressure drop at the pump intake 52, safeguarding the pump from cavitation due to blockages or extreme pressure drops in the inlet side of the system due to foreign matter, damaged pipes, heavy cold weather fluid, or other causes.

In FIG. 7, another modification of the system is illustrated as comprising substantially the same components as in FIG. 5 except that there is no filter, and the control device is slightly different in that control pressure to the bottom of the pison 61 is taken directly from the passage 51 through a passage 76. If desired, a filter may be provided at almost any place in the system such as those indicated by the dotted line elements 77 and 78.

The element 50 still operates to establish minimum pressure at the inlet side of the pump 53 as previously described.

A further modification of the invention is illustrated in FIGS. 8-10 as comprising a housing 80 having an inlet port 81, an outlet port 82, and an alternative outlet port 83 which is shown here as being blocked by a plug 84. These ports are all open to a fluid passage 85. The passage 85 is open to a control chamber 86 in which is slidably carried a substantially cylindrical bypass piston valve 87 piloted on a cylindrical sleeve 88.

A cap 89 is secured to the housing 80 and has a stepped recess 90, one step 90A providing a seat for the sleeve 88, a second step 90B providing an annular passage 91 around the sleeve and open to the bottom of the piston valve 87 which seats when in the closed or retracted position on a third step 90C.

A constant source of pressure such as atmospheric pressure in a drain is admitted through a port 92 and passage 93 in the cap 89 to the annular passage 91 and acts on the bottom of the piston valve 87. The upper end of the piston valve 87 is open to the pressure in the passage 85 connected through ports 81 and 82 respectively to a reservoir 95 and the inlet side of a pump 96. A spring 97 urges the piston valve 87 toward its retracted or closed position. Thus the piston valve 87 will be actuated by a drop in differential between pump inlet pressure sensed in the passage 85 and constant pressure sensed in the passage 91 if such pressure drop is sufficient to overcome the force of the spring 97. In other words, the spring 97 controls the pressure differenital and permits the valve to open only that amount necessary to create a balance across the piston valve 87.

Pressure from the outlet side of the pump is admitted through a port 98 in the cap 89 to the inside of the pilot sleeve 88 which is provided with ports 99 opening the interior at all times to an annular groove 100 provided on the inner surface of the piston valve 87 as shown. When the piston valve 87 extends upon increase in the aforesaid pressure drop; that is, on decrease of pump inlet pressure in passage 85, the annular groove 100 moves into communication with the passage 85, so that pressure fluid will then be bypassed from the outlet side of the pump to the inlet side.

A center post 101 having axial vanes 102 is disposed in the passage 85 concentrically with the spring 97 and axially with respect to the piston valve 87. The sleeve 88 is preferably made with inner and outer elements 103 and 104, the inner element 103 having a closed upper end 105 and is thus held in place by the post 101. The outer element 104 is utilized to prevent the piston valve 87 from sticking. Any binding of the piston valve 87 will act to also raise the outer element 104. Then with the piston valve 87 open, the pressure above the element 104 will be higher than the constant pressure below it, and it will be urged down to its normal position.

When the piston valve 87 opens, as indicated by the dot-dash lines 87A in FIG. 8, the passage 85 becomes partially restricted, and pressure fluid bypassing through the piston valve 87 will be directed by the vanes 102 to the port 82, producing a siphoning effect which assists flow of fluid from the port 81 to the port 82.

The housing 80 carries an indicator element 110, as shown in FIGS. 9 and 10, comprising a shaft 111 extending through the wall of the housing 80 into the passage 85, an actuator arm 112 fixed to the inner end adapted to engage the upper end of the piston valve 87 as shown in FIGS. 8 and 10, and a pointer 113 fixed to the outer end adapted to indicate visually the position of the piston valve 87 to reflect pressure conditions in the system. The piston valve 87 on opening, actuates the arm 112 to move the pointer from full closed toward full open position.

If desired, alternative fluid pump inlet paths may be provided in the present system, as indicated by the alternative dash lines 115 and 116, and an alternative fluid outlet path 117 may also be used. Functionally, however, the system operates substantially the same as is above described.

Although I have described only a few embodiments of the invention, it will be apparent to one skilled in the art to which my invention pertains that various changes and modifications may be made therein without departing from the spirit of the invention or the scope of the appended claims.

I claim:

1. In a fluid supply system, a pump having a discharge outlet and an intake, said intake connected with a fluid source, a bypass means actuated in response to a predetermined decrease in pump intake pressure to openly connect said intake and outlet whereby to recirculate fluid through said pump for reducing likelihood of damage to said pump produced by excessive pressure differential across said pump and to assist fluid warm-up, a fluid filter disposed intermediate said fluid source and said pump intake, said bypass means including means operable only during recirculation of fluid to variably restrict the connection between the pump intake and said fluid source to a degree relative to the degree of decrease in pump intake pressure.

2. The system as defined in claim 1 and in which said bypass means variably openly connects said intake and outlet, and indicator means actuated by said bypass means and operable to indicate the degree of connection between said intake and outlet.

3. In a fluid supply system, a pump having a discharge outlet and an intake, said intake connected with a fluid source and a bypass means actuated in response to a predetermined decrease in pump intake pressure to openly connect said intake and outlet whereby to recirculate fluid through said pump, said bypass means comprising a housing having a control chamber, pressure responsive means in said control chamber, a first means connecting said chamber with a source of substantially constant pressure, a second means connecting said chamber with said pump intake, and a third means connecting said chamber with said pump discharge outlet, said pressure responsive means being actuated by a predetermined increase in pressure differential between the constant pressure and pump intake pressure to openly connect said third means with said second means, said pressure responsive means comprising a spool piston having an annular groove openly registering at all times with said second means and openly registering with said third means only on a predetermined increase of said pressure differential.

4. The system as defined in claim 3 and including means constantly urging said piston in a direction in which said annular groove is out of registry with said third means.

5. In a fluid supply system, a pump having an intake connected with a fluid source and a discharge outlet, a bypass means actuated in response to a predetermined decrease in pump intake pressure to openly connect said intake and outlet whereby to recirculate fluid through said pump, said bypass means comprising a housing having an inlet port and an outlet port respectively openly connected to said fluid source and said pump intake, a fluid passage openly connecting said ports, a pressure port openly connected with said pump discharge outlet, a control chamber connected intermediate said pressure port and said fluid passage, and pressure responsive valve means in said control chamber for variably openly connecting said pressure port with said fluid passage, means connecting said valve means to a substantially constant pressure urging said valve means toward an open position, means resiliently resisting said constant pressure with a greater predetermined force, and said control chamber admitting pump intake pressure to said valve means such that a predetermined increase in differential between said pump intake pressure and said constant pressure variably opens said valve means against the aforesaid predetermined force.

6. A fluid flow system adapted for closed and open loop circuit operations and comprising a reservoir, a pump having an intake and an outlet, a fluid user, means operable in open loop circuit operation to conduct supply fluid from the reservoir to the pump intake and from the pump outlet to the user, and to conduct return fluid from the pump outlet and the user to the reservoir, means operable in closed loop circuit operation to conduct said return fluid to said pump inlet and to conduct from the reservoir to the pump intake only makeup fluid required to replenish system losses, and control means for selective changing of said system between closed and open loop circuit operation.

7. The system as defined in claim 6 and in which said control means comprises means responsive to a predetermined increase of pump pressure differential to change said system from open to closed loop circuiting.

8. The system as defined in claim 6 and in which said control means comprises means limiting allowable increase of pump pressure differential.

9. In a fluid supply system, a pump having a discharge outlet and an intake, said intake connected with a fluid source and a bypass means actuated in response to a predetermined decrease in pump intake pressure to openly connect said intake and outlet whereby to recirculate fluid through said pump, said bypass means including means operable only during recirculation of fluid to variably restrict the connection between the pump intake and said fluid source, said restricting means being operable to a degree relative to the degree of decrease in pump intake pressure, said restricting means incorporating a fluid passage injecting pump outlet fluid into the recirculating circuit in a direction to assist flow from the fluid source to the pump intake by siphoning.

10. In a fluid supply system, a pump having a discharge outlet and an intake, said intake connected with a fluid source, a bypass means actuated in response to a predetermined decrease in pump intake pressure to openly connect siad intake and outlet whereby to circulate fluid through said pump for reducing likelihood of damage to said pump produced by excessive pressure differential across said pump and to assist fluid warm-up, said bypass means comprising a housing having an inlet port and an outlet port respectively openly connected to said fluid source and said pump intake, a fluid passage openly connecting said ports, a pressure port openly connected with said pump discharge outlet, a substantially cylindrical control chamber connected intermediate said pressure port and said fluid passage, a hollow pilot sleeve disposed concentrically in said control chamber and surrounding said pressure port, a cylindrical piston valve disposed concentrically between the control chamber wall and said pilot sleeve, one end of said piston valve being open to the fluid pressure in said fluid passage, means connecting the other end of said piston valve to a substantially constant pressure whereby pressure differential tends to extend said piston valve with respect to said pilot sleeve, said piston valve and said sleeve having passages moved into registry and openly connected with said fluid passage on extension of said piston valve, and means resiliently urging said piston valve to a retracted position.

References Cited in the file of this patent

UNITED STATES PATENTS

| | | |
|---|---|---|
| 1,029,409 | Whitteman | June 11, 1912 |
| 1,816,821 | Bassett | Aug. 4, 1931 |

(Other references on following page)

UNITED STATES PATENTS

| | | |
|---|---|---|
| 1,849,702 | Bard | Mar. 15, 1932 |
| 1,855,061 | Lauchenauer | Apr. 19, 1932 |
| 1,903,332 | Bellar et al. | Apr. 4, 1933 |
| 1,981,507 | Harris et al. | Nov. 20, 1934 |
| 2,064,795 | Gerdts | Dec. 15, 1936 |
| 2,203,077 | Carpenter | June 4, 1940 |
| 2,243,074 | Anderson | May 27, 1941 |
| 2,374,822 | Le Clair | May 1, 1945 |
| 2,572,263 | Hofer | Oct. 23, 1951 |
| 2,644,400 | Hofer | July 7, 1953 |
| 2,705,501 | Fritzsch | Apr. 5, 1955 |
| 2,893,418 | Leventhal | July 7, 1959 |
| 2,960,996 | Haselton | Nov. 22, 1960 |
| 2,963,219 | Palmqvist et al. | Dec. 6, 1960 |
| 2,996,892 | Clark | Aug. 22, 1961 |
| 3,002,461 | Eames | Oct. 3, 1961 |
| 3,003,423 | Drutchas | Oct. 10, 1961 |